United States Patent [19]

Akatani et al.

[11] Patent Number: 5,688,288
[45] Date of Patent: Nov. 18, 1997

[54] DISPERSE DYE COMPOSITION AND METHOD FOR DYEING HYDROPHOBIC FIBER MATERIAL THEREWITH

[75] Inventors: Yoshiki Akatani, Tokyo; Yasuo Murakami, Kawaguchi; Hiroyuki Matsumoto; Kiyoko Tanaka, both of Omiya, all of Japan

[73] Assignee: Nippon Kayaku Kabushiki Kaisha, Tokyo, Japan

[21] Appl. No.: 768,192

[22] Filed: Dec. 17, 1996

Related U.S. Application Data

[63] Continuation of Ser. No. 423,503, Apr. 17, 1995, abandoned.

[30] Foreign Application Priority Data

Apr. 19, 1994 [JP] Japan .................. 103196

[51] Int. Cl.$^6$ ...................... D06P 1/18
[52] U.S. Cl. .................. 8/639; 8/638; 8/662; 8/691; 8/696
[58] Field of Search .................. 8/638, 639, 662, 8/691, 696

[56] References Cited

U.S. PATENT DOCUMENTS

| | | | |
|---|---|---|---|
| 4,062,642 | 12/1977 | Deucker et al. | 8/1 UA |
| 5,358,536 | 10/1994 | Koshida et al. | 8/471 |
| 5,431,699 | 7/1995 | Lange et al. | 8/639 |

FOREIGN PATENT DOCUMENTS

| | | |
|---|---|---|
| 0093926 | 11/1983 | European Pat. Off. . |
| 0347685 | 12/1989 | European Pat. Off. . |
| 0387642 | 3/1990 | European Pat. Off. . |
| 0526170 | 2/1993 | European Pat. Off. . |
| 2313495 | 12/1976 | France . |
| 2313495 | 12/1996 | France . |
| 4304744 | 8/1994 | Germany . |

OTHER PUBLICATIONS

Chemical Abstracts, vol. 114, No. 4, 28 Jan. 1991 of JP 02-185570.

*Primary Examiner*—Margaret Einsmann
*Attorney, Agent, or Firm*—Nields & Lemack

[57] ABSTRACT

A disperse dye composition comprising one or more dyes represented by the formula:

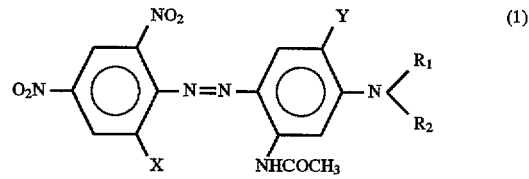

(1)

wherein X represents a chlorine or bromine atom; Y a hydrogen atom or an alkoxy or alkoxyalkoxy group; and each of $R_1$ and $R_2$ independently a hydrogen atom, a linear or branched unsubstituted or substituted alkyl group, an allyl group or a cycloalkyl group, provided that each of the alkyl and alkoxy groups has 1 to 4 carbon atoms, and a dye represented by the formula:

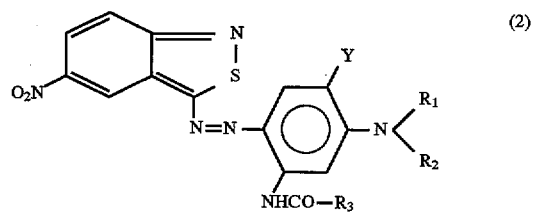

(2)

wherein Y represents an alkoxy or alkoxyalkoxy group; each of $R_1$ and $R_2$ independently a hydrogen atom, a linear or branched unsubstituted or substituted alkyl group, an allyl group or a cycloalkyl group, and $R_3$ an alkyl group, provided that each of the alkyl and alkoxy groups has 1 to 4 carbon atoms.

12 Claims, No Drawings

DISPERSE DYE COMPOSITION AND METHOD FOR DYEING HYDROPHOBIC FIBER MATERIAL THEREWITH

This application is a continuation of application Ser. No. 08/423,053 filed Apr. 17, 1995 now abandoned.

BACKGROUND OF THE INVENTION

The present invention relates to a dye composition and a method for dyeing therewith. More particularly, it is concerned with a water-insoluble disperse dye composition comprising specified dyes and with a method for dyeing hydrophobic fibers therewith.

In recent years, hydrophobic fibers, especially polyester fibers, have come to be indispensable as textile materials because of their excellent fiber properties in the field of dyeing industry. Processing of a ceremonial dress or formal wear with the use of a black disperse dye is one of such dye processings widely conducted in recent years.

In this area of dyeing, a high value is desired on the dyed material having a color tone as deeply black as possible. Thus, various studies have been made with a view toward realizing a deep black called "raven-black".

For example, such studies have led to a method of modifying a fiber per se, e.g. by forming a plurality of micropores on the surface of the fiber; to an improvement of post-dyeing processing (processing for deepening the color tone of the dyed material), e.g. by forming a resin film of low refractive index on the surface of the fiber; to development of new dyes capable of imparting a deep black, etc. Of these, with respect to the dyes, it is required that not only be a deep black imparted but also the change in shade occurring upon the change of the light source be slight, namely, the color rendering property be slight.

The change in shade of a dyed material which occurs upon the change of the light source is known as "color rendering property". Generally, the change in shade is likely to occur on black dyed materials, and in this case the change in shade under a tungsten light source representative of the standard light source A prescribed in JIS Z-8720 (1983) from the color tone under the standard light source D65 prescribed in JIS Z-8720 (1983) or the like frequently arouses problems. This is because the relative spectral distribution of tungsten lamp markedly differs from that of the standard light source $D_{65}$ or the like, so that a great shade change occurs. For example, many of spotlights often employed in hotels and wedding halls are each composed of a tungsten lamp, and the phenomenon occurs that a textile which should have been deep-black looks markedly reddish when illuminated by the spotlight.

The methods having been employed for improving the above change in shade (color rendering property) include those in which the dyeing is conducted with the use of a dye composition containing a compound exhibiting absorption in a wavelength of 650 to 800 nm, as described in Japanese Patent Laid-Open Nos. 246964/1987, 246965/1987, 18955/1993, 284562/1989, etc. However, the above hitherto developed compounds exhibiting absorption in a long wavelength (or near infrared region) have not been satisfactory in the color rendering improving effect.

SUMMARY OF THE INVENTION

The inventors have made extensive and intensive studies with a view toward resolving the above problems. As a result, it has been found that the above problems can be resolved by performing dyeing with the use of a mixture of disperse dyes having specified structures. The present invention has been completed on the basis of the above finding. That is, the present invention relates to a disperse dye composition comprising one or more dyes represented by the formula:

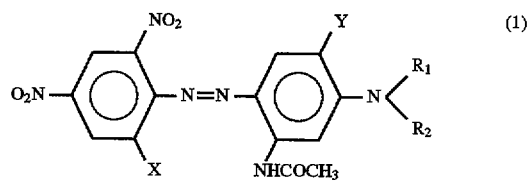

wherein X represents a chlorine or bromine atom; Y a hydrogen atom or an alkoxy or alkoxyalkoxy group; and each of $R_1$ and $R_2$ independently a hydrogen atom, a linear or branched unsubstituted or substituted alkyl group (provided that the substituent is selected from among chlorine and bromine atoms and cyano, alkoxy, hydroxy, aryl, aryloxy, alkoxycarbonyl, alkoxycarbonyloxy, acyloxy and allyloxy groups), an allyl group or a cycloalkyl group, provided that each of the alkyl and alkoxy groups has 1 to 4 carbon atoms, and a dye represented by the formula:

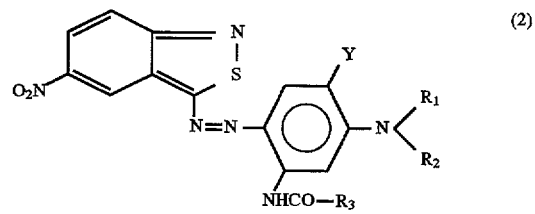

wherein Y represents an alkoxy or alkoxyalkoxy group; each of $R_1$ and $R_2$ independently a hydrogen atom, a linear or branched unsubstituted or substituted alkyl group (provided that the substituent is selected from among cyano, hydroxy, alkoxy, aryl, aryloxy, alkoxycarbonyl, alkoxycarbonyloxy, acyloxy and allyloxy groups), an allyl group or a cycloalkyl group, and $R_3$ an alkyl group, provided that each of the alkyl and alkoxy groups has 1 to 4 carbon atoms;

a black dye composition containing one or more dyes represented by the formulae (1) and (2); and a method for dyeing a hydrophobic fiber material which comprises applying the disperse dye composition of the item (1) or (2) above.

DETAILED DESCRIPTION OF THE INVENTION

The present invention will now be described in detail.

Black dyed hydrophobic fibers, especially polyester fibers, are conventionally obtained by the method in which the dyeing is conducted mainly with the use of a navy blue disperse dye represented by the formula (1), an orange disperse dye and another disperse dye. However, most of the navy blue disperse dyes have maximum absorption wavelengths not longer than 560–620 nm, so that the above phenomenon occurs that the dyed material looks reddish under the light source such as the tungsten lamp whose relative spectral distribution is biased toward the longer wavelength side. The inventors have found that the above phenomenon of the dyed material's looking reddish can remarkably be improved by the use of a dye composition comprising a mixture of a navy-blue disperse dye of the formula (1) and a blue to green disperse dye of the formula (2). As a result, the present invention has been completed. A dyed material whose color rendering property is extremely slight, i.e. whose change in shade occurring under different light sources is extremely slight, can be obtained by the dyeing of hydrophobic fibers with the use of the dye composition of the present invention.

The dye composition of the present invention may be produced by blending the dye represented by the formula (1) with the dye represented by the formula (2) usually in respective proportions of 50 to 98% by weight and 50 to 2% by weight, more preferably, 70 to 95% by weight and 30 to 5% by weight. In the production of the dye composition of the present invention, other dyes, for example, for modifying the hue may be added as long as the addition is not detrimental to the object and effect of the present invention.

The dye composition of the present invention containing the dyes of the formulae (1) and (2) can be mixed with at least one dye selected from the group consisting of yellow, orange and red disperse dyes to form a black dye composition (the proportion of at least one dye selected from the group consisting of yellow, orange and red dyes is preferably 30 to 50% by weight based on the total weight of the black dye composition).

Each of the dyes represented by the formulae (1) and (2) to be employed in the production of the dye composition of the present invention is either known or may be easily obtained by known processes (Diazotization of primary aromatic amine followed by coupling reaction). For example, the dye of the formula (1) may be easily produced by the processes described in Japanese Patent Publication Nos. 6592/1987, 12035/1970, 25431/1965, 14714/1969, 34516/1971, 39489/1974, 37391/1986, 47588/1993, etc. while the dye of the formula (2) may be easily produced by the processes described in Japanese Patent Publication No. 11024/1970, 12036/1970, 505/1992 and Japanese Patent Laid-Open Nos. 4526/1973, 66957/1980, etc.

In the present invention, preferred examples of the substituents in the formula (1) are as follows. Each of $R_1$ and $R_2$ may be selected from not only a hydrogen atom but also linear or branched substituted alkyl groups having 1 to 4 carbon atoms such as β-chloroethyl, β-bromoethyl, β-cyanoethyl, β-methoxyethyl, β-ethoxyethyl, γ-methoxybutyl, β-butoxyethyl, γ-methoxypropyl, β-hydroxyethyl, γ-phenylpropyl, γ-methoxy-β-hydroxypropyl, benzyl, β-phenethyl, β-phenoxyethyl, methoxycarbonylmethyl, β-methoxycarbonylethyl, β-methoxycarbonyloxyethyl, β-ethoxycarbonyloxyethyl, β-acetoxyethyl, β-propionylethyl and β-allyloxyethyl groups. Examples of the cycloalkyl groups include cyclopentyl and cyclohexyl groups.

Also, preferred examples of the substituents in the formula (2) are as follows. Each of $R_1$ and $R_2$ may be selected from not only a hydrogen atom but also linear or branched substituted alkyl groups having 1 to 4 carbon atoms such as β-cyanoethyl, β-hydroxyethyl, β-methoxyethyl, β-ethoxyethyl, β-butoxyethyl, γ-methoxypropyl, γ-methoxybutyl, β-phenetyl, γ-phenylpropyl, β-phenoxyethyl, methoxycarbonylmethyl, β-methoxycarbonylethyl, β-methoxycarbonyloxyethyl, β-ethoxycarbonyloxyethyl, β-acetoxyethyl, β-propionyloxyethyl and β-allyloxyethyl groups. Examples of the cycloalkyl groups include cyclopentyl and cyclohexyl groups.

The dye composition of the present invention may be obtained by first blending and the above dyes of the formulae (1) and (2) preferably in the above proportions and then pulverizing (dispersing) the blend. Alternatively, it may be obtained by first separately pulverizing (dispersing) the above dyes and then mixing the resultant dyes in the above proportions. In the latter, separately pulverized (dispersed) dyes are added to a dye bath to thereby form a proportion identical with the dye composition of the present invention in the dye bath.

The pulverization of each or a blend of the dyes of the formulae (1) and (2) is generally achieved by thorough wet pulverization using a grinder such as a ball mill, a sand grinder or a sand mill in the presence of an anionic dispersant such as a formalin condensate of naphthalenesulfonic acid and alkylbenzenesulfonic acid, a formalin condensate of naphthalenesulfonic acid, a formalin condensate of cresolsulfonic acid, a formalin condensate of cresol and 2-naphthol-6-sulfonic acid, a formalin condensate of alkylnaphthalenesulfonic acid, a formalin condensate of creosoteoilsulfonic acid, or ligninsulfonic acid; a nonionic dispersant such as a block copolymer of ethylene oxide and propylene oxide, an ethylene oxide adduct of alkylphenol, or an ethylene oxide adduct of polystyrenated phenol; or a mixture of such an anionic surfactant and such a nonionic surfactant together with a small amount of water. In this pulverization, the dyes are generally incorporated into the dye composition in an amount of 10 to 50% by weight based on the total weight of the composition. The dye composition of the present invention is applied to practical dyeing either directly in the form of a paste resulting from the pulverization or after drying.

Examples of the hydrophobic fibers dyeable according to the method of the present invention include polyester, triacetate, diacetate and polyamide fibers, and union yarns made therefrom. The above hydrophobic fibers may also include union yarns made from the above fibers, in combination with regenerated fibers such as rayon fibers or natural fibers such as cotton yarn, silk and wool.

In the dyeing of hydrophobic fibers with the use of the dye composition containing one or more dyes of the formula (1) and the dye of the formula (2), and, if necessary, yellow, orange and/or red disperse dyes, it is advantageous to dye the fibers immersed in a water under pressure at 105° C. or higher, preferably 110° to 140° C. The dyeing time generally ranges from 30 to 150 min (high-temperature dyeing). Further, the dyeing can be conducted in the presence of a carrier such as o-phenylphenol or trichlorobenzene at a relatively high temperature, for example, while the water is boiling (carrier dyeing). Still further, the dyeing known as the thermosol process can be conducted in which a cloth is padded with a dye dispersion and dry heated at 150° to 230° C. for a period of 30 sec to 1 min (thermosol dyeing). Still further, the dyeing according to the textile printing process may be conducted in which a cloth is printed with a printing paste for textile printing prepared by mixing the dye composition of the present invention with a natural thickening agent (e.g., locust bean gum or guar gum), or a processed thickening agent (e.g., cellulose derivative such as carboxymethylcellulose or processed locust bean gum), or a synthetic thickening agent (e.g., polyvinyl alcohol or polyvinyl acetate), followed by steaming or thermosol treatment (textile printing).

In case of obtaining black dyeings of hydrophobic fibers, the following method, for example may be applied.

The above obtained dye composition of the present invention containing the dyes of the formulae (1) and (2) is mixed with one or more yellow, orange or red disperse dyes to obtain a black dye composition and subjected to dyeing mentioned above. Alternatively, the dye composition (after pulverization) of the present invention and yellow, orange or red dyes are added together to a dye bath to form a black dye and subjected to the same dyeing as mentioned above. Furthermore, in other method, the dye of the formula (1), the dye of the formula (2) of the present invention and yellow, orange or red dyes may be blended then pulverized by the same method as mentioned above and subjected to the same dyeing. As the dyes which are blended with the dye composition containing the dyes of the formulae (1) and (2) of the present invention and form black dyes, there may be used many kind of yellow, orange or red disperse dyes without restriction. And as an example of such dyes, there may be mentioned C. I. Disperse Orange 30, 31, 37, 44, 61, 62, 73, 74, 80, 148, C. I. Disperse Yellow 163, C.I. Disperse Red 179.

The effect of the present invention will be described below with reference to Table 1. In the description, the "parts" and "%" respectively mean "parts by weight" and "% by weight".

Table 1 shows results obtained by carrying out dyeings with the use of the black dye compositions of Examples 1 to 4 according to the present invention which each contain the dyes of the formulae (1) and (2) and an orange dye and by testing the color rendering property of each of the resultant black dyed materials. In Comparative Example 1 the composition not containing the dye of the formula (2) was used, and in Comparative Example 2, the composition containing the dye represented by the formula (5) which is described in Example 2 of Japanese Patent Publication No. 6675/1994 in place of the dye of the formula (2) was used.

It is recognized from Table 1 that all the dye compositions of the Examples of the present invention impart to the dyed materials extremely slight color rendering, i.e., the property of having extremely slight change in shade under different light sources as compared with the composition of Comparative Example 1 containing no color rendering improving component. Moreover, it is recognized that the color renderings of the dye compositions of the present invention are slighter than those of the composition of Comparative Example 2 containing the dye described in Example 2 of Japanese Patent Publication No. 6675/1994 especially with respect to the dyed materials having undergone deepener treatment.

TABLE 1

| Color Rendering Property Test[Note 3] | | |
|---|---|---|
| | Degree of change in shade under two different types of light sources | |
| Dye compsn. | Untreated | After deepener treatment[Note 4] |
| dye compsn. of Ex. 1 of the invention | 4–5 | 4–5 |
| dye compsn. of Ex. 2 of the invention | 4–5 | 4–5 |
| dye compsn. of Ex. 3 of the invention | 4 | 4 |
| dye compsn. of Ex. 4 of the invention | 4–5 | 4–5 |
| Comp. Ex. 1[Note 1] | 2R | 2R |
| Comp. Ex. 2[Note 2] | 4 | 3–4R |

[Note 1] Demol N (anionic dispersant produced by Kao Corp.) was added to 8 parts of the dye represented by the TABLE 1-continued following formula (3), 4 parts of the dye represented by the following formula (4) and 4 parts of C. I. Disperse Orange 37 in an amount sufficient to make the total quantity 100 parts. A small amount of water was added thereto, pulverized (dispersed) by the use of a sand grinder and dried in vacuo to thereby obtain a dye composition which was designated Comparative Example 1.

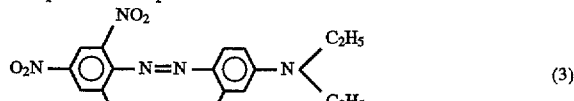

(3)

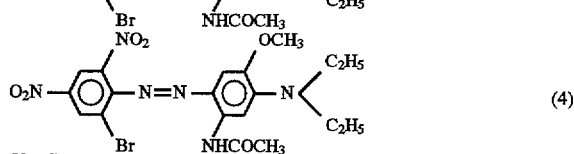

(4)

[Note 2] The same dyes as employed in Comparative Example 1 were blended in the same proportions, and 3 parts of the dye represented by the formula (5) and described in Example 2 of Japanese Patent Publication No. 6675/1994 was added thereto. Further, Demol N was added in an amount sufficient to make the total quantity 100 parts. The same treatments were carried out in the same manner as in Comparative Example 1 to thereby obtain a dye composition which was designated Comparative Example 2.

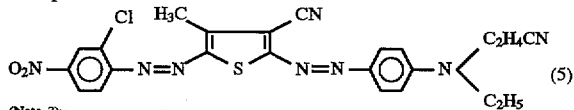

(5)

[Note 3] Pure water adjusted to pH 4.5 was added to 10 parts of each of the dye compositions obtained in Examples 1 to 4 and Comparative Examples 1 and 2 to thereby make the total quantity 3000 parts. Thus, six different dye baths were prepared. 100 parts of a tropical cloth of polyester was immersed in each of the dye baths and dyed at 130° C. for 60 min. Thereafter, a reduction clearing of each of the dyed cloths was conducted at 80° C. for 10 min in a bath prepared by adding 6 parts of 45% sodium hydroxide, 6 parts of hydrosulfite and 3 parts of Sunmol RC-700 (anionic surfactant produced by Nikka Chemical Co., Ltd.) to pure water so that the total quantity was 3000 parts, followed by water washing and drying. Thus, black dyed cloths were obtained. The color rendering property of each of the obtained dyed cloths was tested. In the color rendering property, the degree of tone change under commercially available tungsten lamp of 5500 K. in color temperature (National Lamp PRF-500W manufactured by Matsushita Electric Industrial Co., Ltd.) from the reference of the tone under the illumination of the standard light source $D_{65}$ prescribed in JIS was visually evaluated with the use of JIS change-in-shade gray scale, and expressed in grade 1 (much change in shade) to 5 (little change in shade). Actually, the dyes with a level 4 or above in grades of change in shade can be practically used without problem. R means the tendency of shade change redder.

[Note 4] Each of the dyed cloths obtained in note 3 above was padded with the use of a total amount of 1000 parts of a liquid containing 40 parts of Schwatt TR-420 (special resin finishing agent produced by Kao Corp.) and adjusted to pH 4, dried and heated at 180° C. for 2 min. The color rendering of each of the obtained cloths was tested in the same manner as in note 3 above.

The present invention will be illustrated in greater detail below with reference to the following Examples. In the Examples, the "parts" and "%" respectively mean "parts by weight" and "% by weight".

EXAMPLE 1

8 parts of the dye represented by the above formula (3), 4 parts of the dye represented by the above formula (4), 4 parts of C. I. Disperse Orange 37 and 3 parts of the dye represented by the following formula (6) together with 81 parts of Demol N (anionic dispersant produced by Kao Corp.) and a small amount of water were pulverized (dispersed) by the use of a sand grinder and dried in vacuo to thereby obtain a black dye composition according to the present invention. Pure water having a pH adjusted to 4.5 was added to 10 parts of the above dye composition to thereby make the total quantity 3000 parts. Thus, a dye bath was prepared. 100 parts of a tropical cloth of polyester was immersed in the dye bath and dyed at 130° C. for 60 min. Thereafter, a reduction clearing of the dyed cloth was conducted at 80° C. for 10 min in a bath prepared by adding 6 parts of 45% sodium hydroxide, 6 parts of hydrosulfite and 3 parts of Sunmol RC-700 (anionic surfactant produced by Nikka Chemical Co., Ltd.) to demineralized water so that the total quantity was 3000 parts, followed by washing and drying. Thus, black dyeings were obtained. The color rendering property of the obtained dyeings was extremely slight (see Table 1 above).

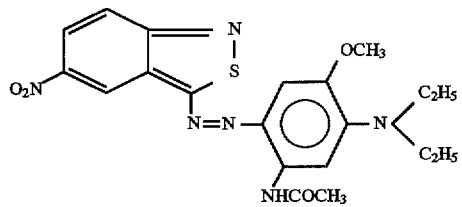

(6)

EXAMPLES 2 to 16

Dyes represented by the following general formula:

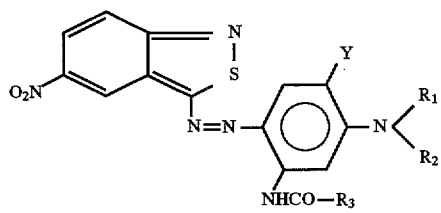

(7)

wherein Y, $R_1$, $R_2$ and $R_3$ were as specified in the following Table 2 were synthesized by the conventional method, used in place of the dye of the formula (6) of Example 1 and treated in the same manner as in Example 1 to thereby produce dye compositions according to the present invention. The dyeing was carried out in the same manner as in Example 1 with the use of each of the obtained dye compositions. All the resultant black dyed cloths exhibited extremely slight color renderings.

TABLE 2

| | Structural Formula | | | |
|---|---|---|---|---|
| Example | Y | $R_1$ | $R_2$ | $R_3$ |
| 2 | —$OCH_3$ | —$C_2H_4OCH_3$ | —$C_2H_4OCH_3$ | —$CH_3$ |
| 3 | —$OCH_3$ | —$C_2H_4CN$ | —$C_2H_5$ | —$CH_3$ |
| 4 | —$OCH_3$ | —$CH_2CH$=$CH_2$ | —$CH_2CH$=$CH_2$ | —$CH_3$ |
| 5 | —$OCH_3$ | —$C_2H_5$ | —$C_2H_5$ | —$C_3H_7$-n |
| 6 | —$OC_2H_4OC_4H_9$-n | —$C_2H_5$ | —$C_2H_5$ | —$CH_3$ |
| 7 | —$OC_2H_4OCH_3$ | —$C_2H_4OH$ | —$C_2H_5$ | —$CH_3$ |
| 8 | —$OCH_3$ | —$C_2H_4$—Ph | —$C_2H_4OCH_3$ | —$C_2H_5$ |
| 9 | —$OCH_3$ | —$C_2H_4O$—Ph | —$C_4H_9$-n | —$CH$ |
| 10 | —$OC_2H_5$ | —$C_2H_4COOC_2H_5$ | —$C_2H_4COOC_2H_5$ | —$CH_3$ |
| 11 | —$OCH_3$ | —$C_2H_4OCOOC_2H_5$ | —$C_2H_4OCOOC_2H_5$ | —$CH_3$ |
| 12 | —$OCH_3$ | —$C_2H_4OCOCH_3$ | —$C_2H_4OCOCH_3$ | —$CH_3$ |
| 13 | —$OCH_3$ | —$C_6H_{12}$ (cyclohexyl) | —H | —$CH_3$ |
| 14 | —$OCH_3$ | —$C_2H_4OCH_2CH$=$CH_2$ | —$C_2H_4OCH_2CH$=$CH_2$ | —$CH_3$ |
| 15 | —$OC_2H_4OCH_3$ | —$C_2H_4OCH_3$ | —$C_2H_4OCH_3$ | —$CH_3$ |
| 16 | —$OC_2H_4OCH_3$ | —$CH_2CH$=$CH_2$ | —$CH_2CH$=$CH_2$ | —$CH_3$ |

(Note)
In Table 2, Ph represents a phenyl group.

EXAMPLE 17

8 parts of the dye represented by the formula (3), 4 parts of the dye represented by the formula (4), and 3 parts of the dye represented by the formula (8) mentioned below together with 85 parts of Demol N (anionic dispersant produced by Kao Corp.) and small amount of water were pulverized (dispersed) by the use of a sand grinder and dried in vacuo to obtain a dye composition of the present invention. Pure water having a pH adjusted to 4.5 was added to 5 parts of the above composition to thereby make the total quantity of 3000 parts, thus dye bath was prepared. 100 parts of tropical cloth of polyester was immersed in the dye bath and dyed at 130° C. for 60 min. Thereafter, a reduction clearing of the dyed cloth was conducted at 80° C. for 10 min. in a bath prepared by adding 6 parts of 45% sodium hydroxide, 6 parts of hydrosulfite and 3 parts of Sunmol RC-700 (anionic surfactant produced by Nikka Chemical Co., Ltd.) to demineralized water so that the total quantity was 3000 parts, followed by washing and drying. Thus, the dyeings of navy blue shade were obtained. The dyeings have high color value and good wet fastness after heat-setting.

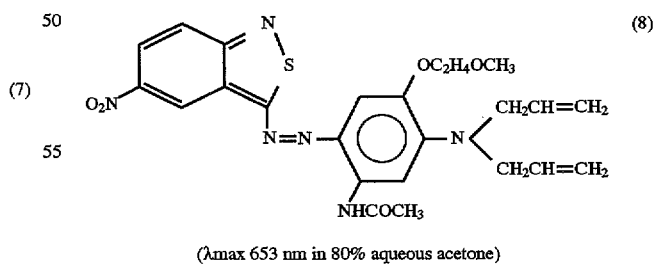

(8)

($\lambda$max 653 nm in 80% aqueous acetone)

EXAMPLE 18

The dye of the formula (9) mentioned below was used in place of the dye of the formula (4) in Example 1 and subjected to the same dyeing treatment to obtain black dyeings. The black dyeings exhibited extremely slight color renderings.

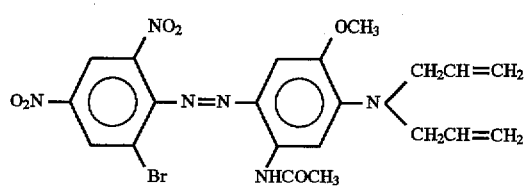
(9)

EXAMPLE 19

12 parts of the dye represented by the formula (10) mentioned below, 4 parts of C. I. Disperse Orange 37 and 3 parts of the dye of the formula (6) together with 82 parts of Demol N (anionic dispersant produced by Kao Corp.) and small water were pulverized (dispersed) by the use of sand grinder and dried in vacuo to obtain a dye composition. Then the same dyeing treatment as in Example 1 was conducted to obtain black dyeings exhibiting extremely slight color renderings.

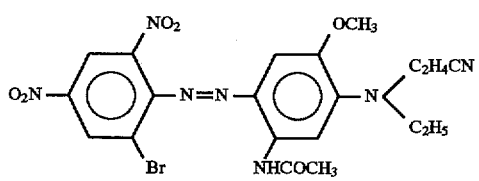
(10)

EXAMPLES 20–38

The dyes of the formula (11)

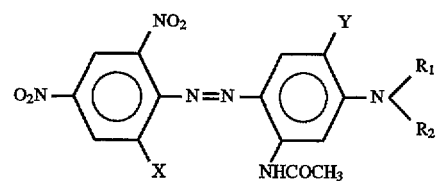
(11)

wherein X, Y, $R_1$ and $R_2$ are as specified in the following Table 3 were synthesized by the conventional method and used in place of the dye of the formula (10) in Example 18. The dyeing is conducted in the same manner as in Example 18, thereby obtaining black dyeings exhibiting extremely slight color renderings.

TABLE 3

| Example | X | Y | $R_1$ | $R_2$ |
|---|---|---|---|---|
| 20 | Br | —OCH$_3$ | —C$_2$H$_4$CN | —CH$_2$CH=CH$_2$ |
| 21 | Br | —OCH$_3$ | —C$_2$H$_4$CN | —C$_2$H$_4$OH |
| 22 | Br | —OCH$_3$ | —C$_2$H$_4$OCOCH$_3$ | —C$_2$H$_4$OCOCH$_3$ |
| 23 | Br | —OCH$_3$ | —C$_2$H$_4$OCH$_3$ | —C$_2$H$_4$OCH$_3$ |
| 24 | Br | —OC$_2$H$_4$OCH$_3$ | —C$_2$H$_4$OCH$_3$ | —H |
| 25 | Cl | —OC$_2$H$_4$OCH$_3$ | —C$_2$H$_4$OCH$_3$ | —H |
| 26 | Br | —OCH$_3$ | —C$_2$H$_4$OCH$_2$CH=CH$_2$ | —C$_2$H$_4$OCH$_2$CH=CH$_2$ |
| 27 | Br | —OC$_2$H$_4$OCH$_3$ | —CH$_2$CH=CH$_2$ | —CH$_2$CH=CH$_2$ |
| 28 | Cl | —OCH$_3$ | —C$_2$H$_4$Cl | —C$_2$H$_4$Cl |
| 29 | Br | —OCH$_3$ | —C$_2$H$_4$Br | —C$_2$H$_4$Br |
| 30 | Br | —OCH$_3$ | —C$_2$H$_4$OH | —C$_2$H$_5$ |
| 31 | Cl | —OCH$_3$ | —C$_3$H$_6$OCH$_3$ | —C$_3$H$_6$OCH$_3$ |
| 32 | Cl | —OCH$_3$ | —CH$_2$CH(OH)CH$_2$OCH$_3$ | —CH$_2$CH(OH)CH$_2$OCH$_3$ |
| 33 | Br | —OCH$_3$ | —CH$_2$—Ph | —C$_2$H$_4$OCH$_3$ |
| 34 | Br | —OCH$_3$ | —CH$_2$—Ph | —CH$_2$CH=CH$_2$ |
| 35 | Br | —OCH$_3$ | —C$_2$H$_4$O—Ph | —C$_2$H$_4$OCOCH$_3$ |
| 36 | Br | —OCH$_3$ | —C$_2$H$_4$COOC$_2$H$_5$ | —C$_2$H$_4$COOC$_2$H$_5$ |
| 37 | Br | —OCH$_3$ | —C$_6$H$_{12}$ (cyclohexyl) | —H |
| 38 | Br | —OCH$_3$ | —C$_2$H$_4$OCOOCH$_3$ | —C$_2$H$_4$OCOOCH$_3$ |

(Note)
In Table 3, Ph represents a phenyl group.

A dyed material exhibiting extremely slight color rendering, i.e. extremely slight change in shade under different light sources can be obtained by the dyeing utilizing the dye composition of the present invention.

What we claim is:

1. A disperse dye composition comprising one or more dyes represented by the formula:

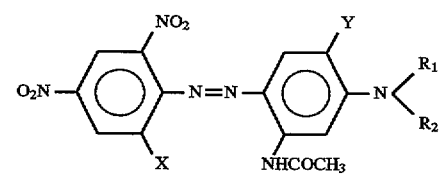
(1)

wherein X represents a chlorine or bromine atom; Y a hydrogen atom or an alkoxy or alkoxyalkoxy group; and each of $R_1$ and $R_2$ independently a hydrogen atom, a linear or branched unsubstituted or substituted alkyl group (provided that the substituent is selected from among chlorine and bromine atoms and cyano, alkoxy, hydroxy, aryl, aryloxy, alkoxycarbonyl, alkoxycarbonyloxy, acyloxy and allyloxy groups), an allyl group or a cycloalkyl group, provided that each of the alkyl and alkoxy groups has 1 to 4 carbon atoms, and a dye represented by the formula:

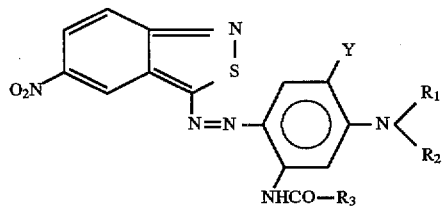
(2)

wherein Y represents an alkoxy or alkoxyalkoxy group; each of $R_1$ and $R_2$ independently a hydrogen atom, a linear or branched unsubstituted or substituted alkyl group (provided that the substituent is selected from among cyano, hydroxy, alkoxy, aryl, aryloxy, alkoxycarbonyl, alkoxycarbonyloxy, acyloxy and allyloxy groups), an allyl group or a cycloalkyl group, and $R_3$ an alkyl group, provided that each of the alkyl and alkoxy groups has 1 to 4 carbon atoms.

2. The dye composition according to claim 1, which comprises 50 to 98% by weight of one or more dyes represented by the formula (1) and 50 to 2% by weight of the dye represented by the formula (2) in claim 1.

3. A black dye composition containing the dye composition according to claim 1.

4. A black dye composition according to claim 3, which contains one or more dyes of the formula (1), a dye of the formula (2), and at least one dye selected from the group consisting of yellow and orange disperse dyes.

5. A dye composition according to claim 1 wherein the dye of the formula (2) is the dye of the formula:

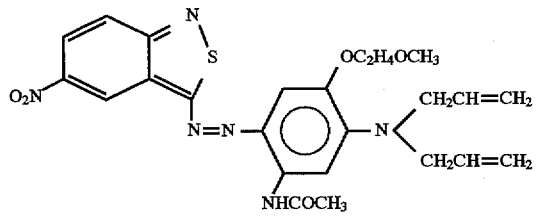
(8)

6. A black dye composition containing the dye composition according to claim 2.

7. A black dye composition according to claim 6, which contains one or more dyes of the formula (1), a dye of the formula (2), and at least one dye selected from the group consisting of yellow and orange disperse dyes.

8. A dye composition according to claim 2 wherein the dye of the formula (2) is the dye of the formula:

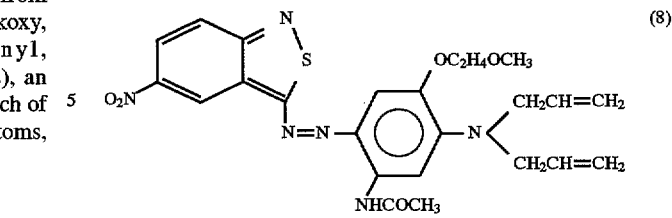
(8)

9. A dye composition according to claim 3 wherein the dye of the formula (2) is the dye of the formula:

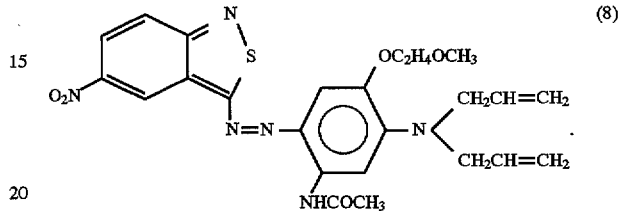
(8)

10. A dye composition according to claim 4 wherein the dye of the formula (2) is the dye of the formula:

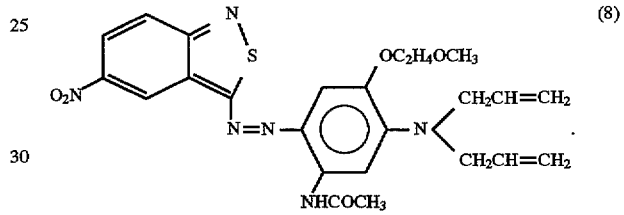
(8)

11. A dye composition according to claim 6 wherein the dye of the formula (2) is the dye of the formula:

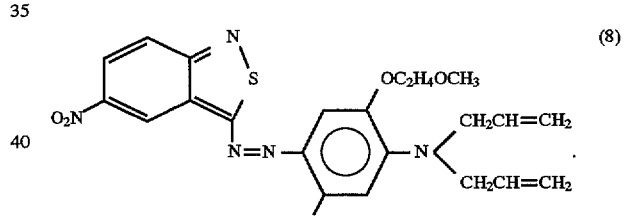
(8)

12. A dye composition according to claim 7 wherein the dye of the formula (2) is the dye of the formula:

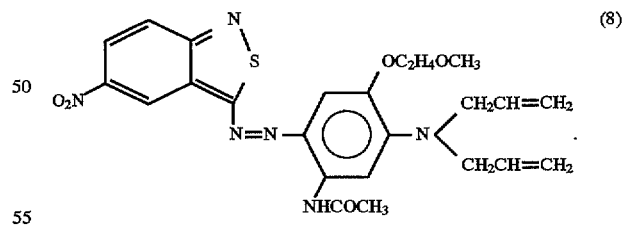
(8)

* * * * *